March 3, 1964     D. W. STEPHENSON ETAL     3,123,699
INDUCTION HEATED CIRCULAR FILM DIE
Filed May 24, 1960     2 Sheets-Sheet 1

INVENTORS.
DANIEL W. STEPHENSON
ROBERT J. SCHROYER
BY
ATTORNEYS.

March 3, 1964   D. W. STEPHENSON ETAL   3,123,699
INDUCTION HEATED CIRCULAR FILM DIE
Filed May 24, 1960   2 Sheets-Sheet 2

INVENTORS.
DANIEL W. STEPHENSON
ROBERT J. SCHROYER
BY
ATTORNEYS.

United States Patent Office 3,123,699
Patented Mar. 3, 1964

3,123,699
INDUCTION HEATED CIRCULAR FILM DIE
Daniel W. Stephenson and Robert J. Schroyer, Cuyahoga Falls, Ohio, assignors to Blaw-Knox Company, Pittsburgh, Pa., a corporation of Delaware
Filed May 24, 1960, Ser. No. 31,391
7 Claims. (Cl. 219—10.49)

This invention relates to the induction heating of circular die heads such as are used in the plastics industries for making blown tubing for the production of sheeting, film and the like.

The principles of induction heating as applied to the processing of plastics are known, having been described in expired patents, but practical difficulties have militated against and largely prevented general use of this method of heating in these and related fields. Mechanical problems stemming out of the attempted application of the heating unit or units where needed to produce the desired temperature in the principal structure are typical of the difficulties encountered when induction heating means are introduced into plastics machinery. Among other things, the manner of application of the heating unit or units must be such that intimate contact, and, if possible, rigidity, are consistently maintained notwithstanding temperature differences which in the course of a single day may run into hundreds of degrees. From a practical standpoint, the solution of these and allied problems is not easy.

Notwithstanding such difficulties, the invention has for its object the provision of ways and means for putting induction heating means to use in circular die heads, to which end it provides a variety of novel features of design, construction and arrangement.

Other objects, advantages and features of the invention will appear from the description which follows and from the accompanying drawings, in which.

Figures 1, 3:
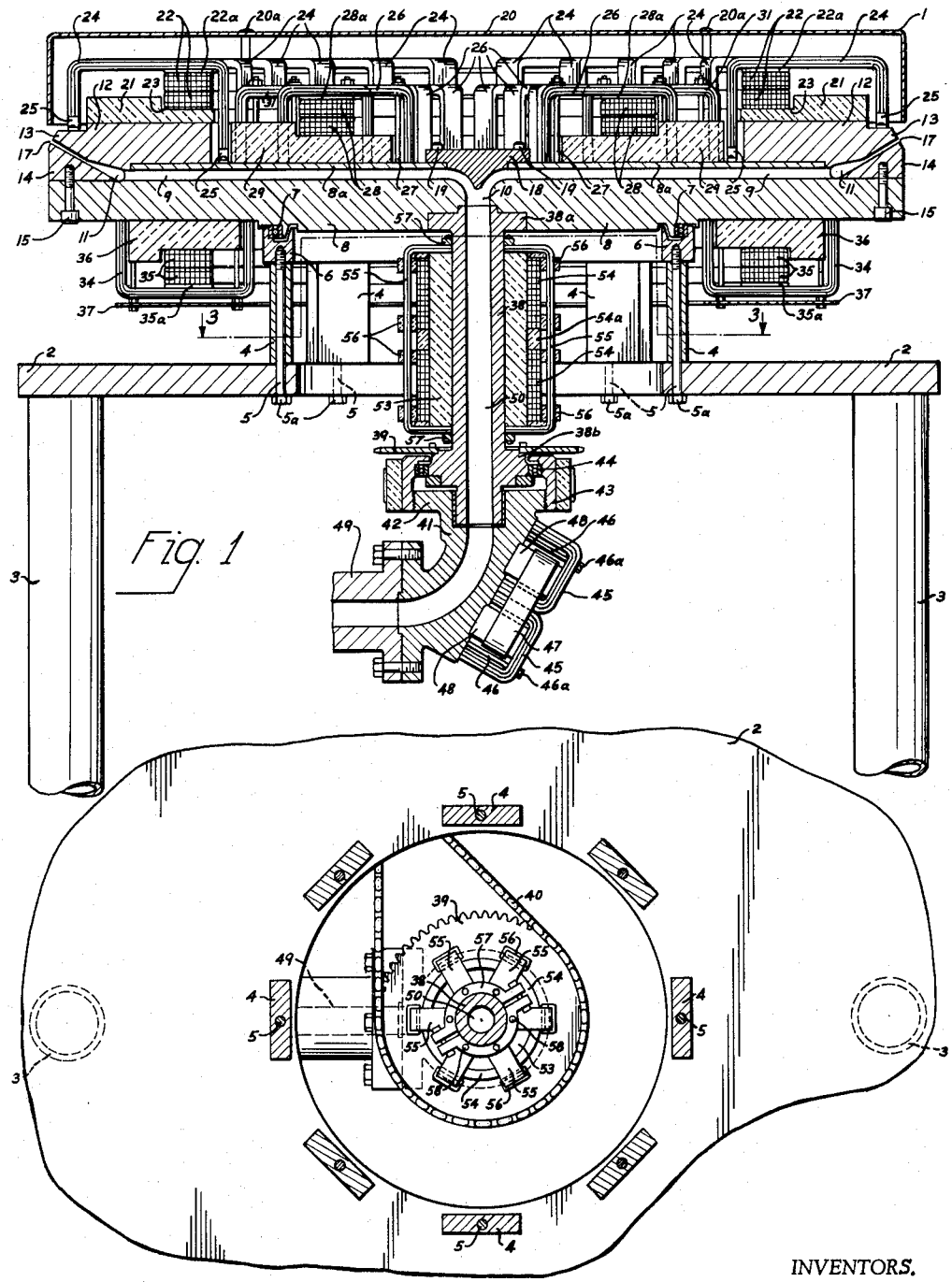
FIGURE 1 is a vertical section, with parts in elevation, through a circular die head incorporating the invention, together with the support therefor.
FIGURE 3 is a fragmentary plan of a portion of the die head on line 3—3 of FIGURE 1.

Referring first to FIGURE 1, the die head generally is designated 1. It is shown as supported from an annular table 2 mounted on posts 3. Extending upward from table 2 is a series of uprights 4 of bar stock, the same being arranged at regular intervals around the opening in table 2. Each of these uprights has an axially extending hole (not shown as such) accommodating a tie rod 5 the lower end of which is headed as at 5a. At its upper end, each tie rod is threaded into a ring-shaped bushing 6 supporting a ball bearing assembly 7 of circular shape. Die head 1 rotates slowly on ball bearing assembly 7 through an arc of something less than 180°.

Die head 1 includes, inter alia, a die body consisting of a plate-like lower die member 8 of generally circular shape provided on its upper face with a raised portion 8a formed after the fashion of an annulus. Within raised portion 8a are channels 9, of which there may be as many as eight or more. These channels extend radially from a central feed opening 10 in plate-like die member 8. They occur at equal angular intervals. At their outer ends is a circular cavity 11 formed largely in a cooperating upper die member 12. The member 12 also forms a part of the die body and is annular or ring-like in shape and is mounted on and held in registry with plate-like die member 8.

Ring-like die member 12 is provided with an integral lip 13. Cooperating with it is a detachable lip 14 held in place by a series of screws 15 extending upward from plate-like die member 8. Between integral lip 13 on die member 12 and lip 14 on die member 8 is the extrusion orifice 17, which, like circular cavity 11, extends completely around the die head. For reasons which will appear, ring-like die member 12 is provided above integral lip 13 with flat cut-away portions 12a separated from each other by off-set portions 12b; see FIGURE 2.

Closing the center of raised portion 8a of plate-like die member 8 is a deflecting plug 18 held in position by screws 19. A shield 20 supported from tie rods 20a is mounted on plate-like die member 8. The function of shield 20 is to protect the top of the die head in the event of breakage of the sleeve formed as the stock is extruded through orifice 17. This sleeve is blown upward from orifice 17 by means of a current of air issuing from conventional blowing means (not shown).

Surmounting the upper surface of the ring-like die member 12 is an annular mass of conventional thermal insulating material 21 formed as shown in FIGURE 1. Two superimposed circular electrical coils 22 rest on an inwardly facing shoulder 23 in insulating material 21. Coils 22 are formed of square turns of copper wire consolidated by means of a suitable high-temperature silicone varnish. Each is wrapped in glass tape and coated with an evacuated epoxy resin. The two coils are surmounted by an annular shim 22a of a suitable thermosetting resin such as one of the phenol-formaldehyde resins. Shim 22a is provided in order that a suitable body of electrical insulation may separate coils 22 and overlying flux guides 24. It is clamped in place between them.

Figure 2:
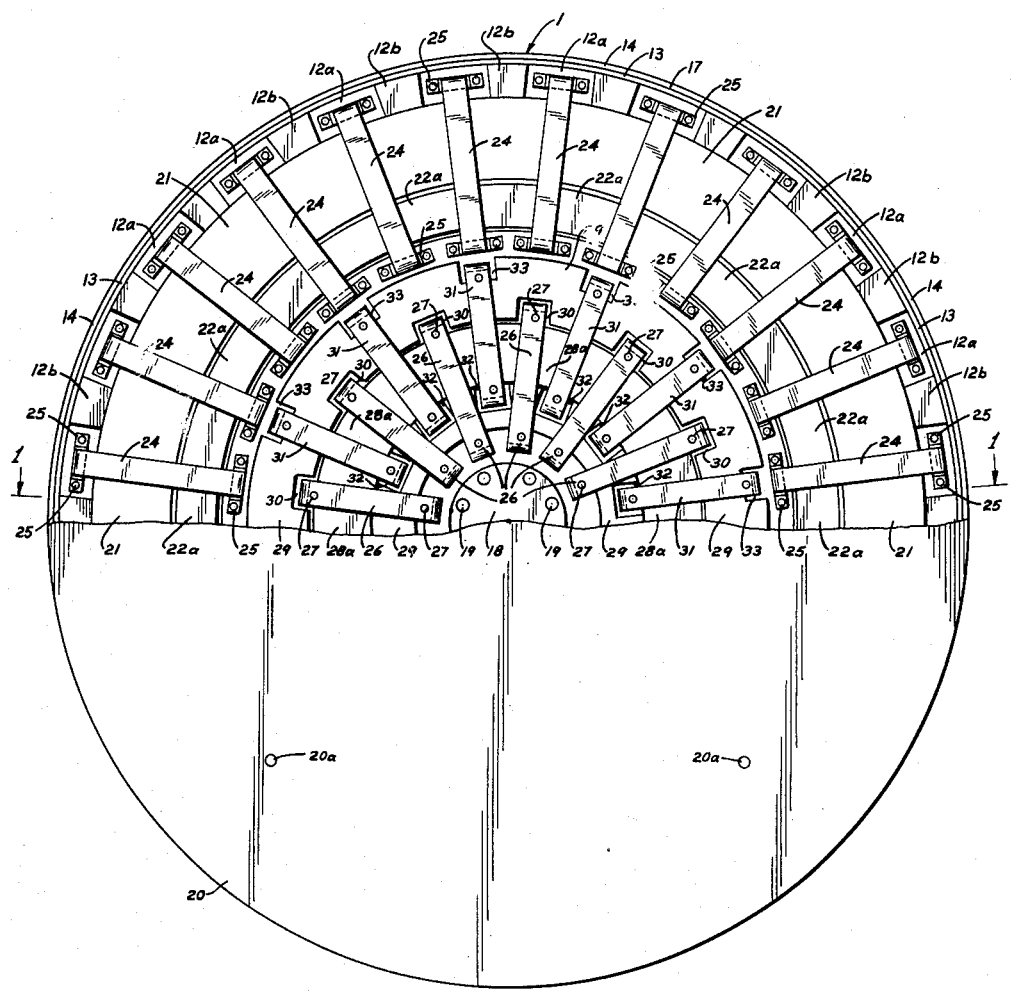
FIGURE 2 is a plan of the die head with the shield partly broken away so as to show the heating means.

Flux guides 24 are laminated of highly grain oriented silicon steel. The guides 24 are generally U-shaped in form of radially extending yokes with a shank or body portion and two transversely extending leg portions. To the lower ends of the leg portions of flux guides 24 L-shaped brackets 25 are bonded by a suitable metallic bond such as silver solder. At one end of each flux guide, one of these brackets is fastened, as by means of a rivet, to the integral lip 13 of ring-like die member 12; at the other end, a like bracket is fastened in like fashion to the upper surface of raised portion 8a of plate-like die member 8. There is a first series of flux guides 24 arranged as shown in FIGURE 2 around the periphery of the die head, each extending in a radial direction almost to the outside edge of ring-like die member 12. Flux guides 24 are spaced from each other at regular angular intervals, as, for example, by angles of 15°.

In operation, conventional low-frequency electrical current is supplied to coils 22 through suitable leads and contacts (not shown). As a result, a magnetic flux develops in flux guides 24 and in the adjacent portions of plate-like die member 8 and ring-like die member 12. The two die members are heated by the eddy currents that result from the alternating flux; also, there is a certain amount of heating due to hysteresis losses. Temperatures of the order of 350 to 400° F. are generated; however, the presence of the mass 21 of thermal insulating material helps prevent the development of external temperatures so high that the operator or operators find conditions unduly uncomfortable.

Directly to the rear of every other flux guide 24 is a generally similar flux guide 26 held to plate-like die member 8 by means of two supporting tie rods 27. Thus flux guides 26 are spaced from each other by angles of approximately 30°. Associated with this second series of flux guides are two superimposed circular electrical coils 28 concentric to the coils 22 and surmounted by an annular shim 28a. Coils 28 seat in an inwardly facing shoulder in a mass of thermal insulating material 29 disposed inwardly of ring-like die member 12. The inner legs of flux guides 26 adjoin deflecting plug 18. Their outer legs pass through openings 30 in insulating material 29; see FIGURE 2. Openings 30 accommodate not only the outer legs of flux guides 26 but also tie rods 27.

Forwardly of but interleaved with the flux guides of the second series is a third series of flux guides 31. As in the case of flux guides 26, flux guides 31 are aligned with alternate flux guides 24. Thus flux guides 31, like flux guides 26, are spaced from each other by angles of approximately 30°. They make use of the same coils 28 and the same mass of thermal insulating material 29 as flux guides 26. To permit the inner legs and tie rods of flux guides 31 to make contact with plate-like die member 8, insulating material 29 has openings 32 similar to openings 30 for flux guides 26. Cut-away areas 33 accommodate the outer legs of flux guides 31.

Thus the top of die head 1, seen as in FIGURE 2, is characterized by three groups of induction heating units in staggered relation to each other. As clearly shown in FIGS. 1 and 2, the spaced apart distance of the legs of the flux guides 26 and 31 is substantially greater than the radial width or extent of the coils 28. This permits the guides to be arranged in staggered relation to each other over a common coil. It will also be noted that the coils 22 and 28 do not, themselves, surround the metal to be inductively heated, but are positioned adjacent the die members and the arrangement of the flux guides directs the heating effect, as desired, into the metal.

On the opposite side of die head 1 is a fourth series of induction heating units, likewise spaced at intervals of about 15° from each other. The induction heating units of this series are made up of flux guides 34, electrical coils 35, an annular mass of thermal insulating material 36, and a supporting structure 37 which takes the form of a sheet metal ring held by tie rods to the bottom of plate-like die member 8. As will be seen from FIGURE 1, the induction heating units of this series lie outwardly of uprights 4, ring bushing 6, and ball bearing assembly 7.

The pads of insulation designated at 21, 29 and 36 protect the associated electric coils 22, 28 and 35 from excessively high temperatures by providing a heat barrier between the die members being inductively heated and the current carrying coils. Thus, the pads 21, 29 and 36 provide means for supporting their respective coils in spaced relation to the adjacent surface of the die members. Also, the pads of thermal insulating material are proportioned to be substantially wider than the associated coils to provide an effective heat barrier to protect these coils.

Associated with die head 1 is a feed conduit 38 provided with upper and lower enlarged portions 38a and 38b, the former comprising the means by which feed conduit 38 is attached to plate-like die member 8. Coupled to enlarged portion 38b are a sprocket 39 and chain 40 for rotating the die head first in one direction and then in the other, as is conventional in most blown film dies. An elbow 41 provided with a threaded flange 42 is held to enlarged portion 38b by a tapped coupling nut 43. Between feed conduit 38 and coupling nut 43 is a ball bearing assembly 44, in which the feed conduit turns when the die head is rotated.

Elbow 41, which is itself provided with induction heating means made up of flux guides 45, tie rods 46 headed at 46a, an electrical coil 47, and a conventional thermal insulating material 48, is connected to supply line 49 as shown in FIGURE 1.

To prevent the stock that is being extruded from cooling as it travels through passageway 50 in feed conduit 38 between elbow 41 and plate-like die member 8, feed conduit 38 likewise is provided with induction heating means. The latter may take the form of a split sleeve 53 of a conventional thermal insulating material, two electrical coils 54 spaced from each other by a separator 54a, and a series of radially disposed flux guides 55. Coils 54 and flux guides 55 are held in the desired relationship to each other by means of spacers 56. At the upper and lower ends of the unit are metal split rings 57 to which the ends of flux guides 55 are attached by rivets 58; see FIGURE 3.

Thus the material being extruded is heated virtually from the time it enters elbow 41 through supply line 49 to the time it is discharged through extrusion orifice 17, including the time required for travel through passageway 50 in feed conduit 38. While it is in die head 1, it is heated by three series of induction heating units on one side of the die head and a fourth series of induction heating units on the opposite side of the die head. In the area in which the induction heating units of the second and third series are interleaved, the induction heating units are closely spaced. This makes it possible to dispense with induction heating units on the opposite side of plate-like die member 8 below the second series of induction heating units.

It is apparent that changes within the skill of those versed in the art may readily be made. Thus conventional electrical resistance units may be employed, if desired, in lieu of the induction heating means that surround feed conduit 38, as by wrapping such resistance units around the feed conduit. In some circumstances, die head 1 may be even closely coupled to elbow 41, thus shortening the length of feed conduit 38 and reducing the need for heating means in the vicinity of the feed conduit. Other departures from what has been described and shown may also be made.

It is intended that the patent shall cover, by summarization in appended claims, all features of patentable novelty residing in the invention.

What is claimed is:

1. A circumferential film die comprising a die body, means in said body forming an annular extrusion orifice, said body having an exposed generally circular surface for the application of heating flux thereto with the outer periphery of said surface being adjacent said extrusion orifice, a circumferential electric induction heating coil having a diameter less than that of said surface, insulating means supporting said coil wholly on one side of said body in spaced relation to said surface, and a plurality of generally U-shaped flux guides having radially extending bodies positioned over said coil and inwardly turned legs on opposite sides of said coil in contact with said surface, said guides being angularly distributed about said coil and die body with the outer legs thereof terminating adjacent said extrustion orifice.

2. A circumferential film die comprising a die body, means in said body forming an annular extrusion orifice, said body having an upper generally circular surface adapted for the application of heating flux thereto, a circumferential electric induction heating coil having a diameter less than that of said surface, means supporting said coil wholly on one side of said body in spaced relation to and generally centered over said surface, and a plurality of generally U-shaped flux guides angularly distributed about said die body surface having longitudinally extending bodies positioned over said coil and inwardly turned legs on opposite sides of said coil in intimate contact with said surface, and insulating shims between said guide bodies and said coil to isolate said coil from direct contact with said flux guides.

3. A circular film die comprising a generally circular die body having a body surface exposed for induction heating defining generally radial passageway means terminating in an outer peripheral film extruding nozzle, means for sustaining the temperature in said passageway means and nozzle at a desired extruding temperature comprising a pair of concentric annular electric induction coils one radially within the other, insulating means on said surface supporting said coils in spaced relation to said body, and a plurality of generally U-shaped flux guides having generally radially extending bodies and inwardly turned legs proportioned to be received over one of said coils into contact with said body surface, said guides distributed uniformly about each of said coils forming two generally concentric rings of flux guides for the controlled application of heating flux to said body surface for the heating of plastic material in said passageway means and nozzle.

4. A circumferential film die comprising upper and lower die members, said lower die member being circumferential and having radial passageways formed therein, means in said upper member forming an extrusion nozzle in communication with said passageways, said upper die member being annular in form and defining a central opening exposing a portion of said lower die member, heating means including an electric induction coil, means supporting said coil in spaced relation to said die members, and a plurality of generally U-shaped flux guides positioned over said coil in angularly disposed relation on said members with outer legs thereof in intimate contact with said upper die member adjacent said nozzle and with inner legs in intimate contact at said exposed portion of said lower die member.

5. A circumferential film die comprising a pair of circumferential die members having upper and lower surfaces and including an upper die member, a lower die member having means forming radial passageways, said upper die member being annular in form exposing a portion of said upper surface of said lower die member and having means defining an extrusion nozzle communicating with said passageways, die heating means including an annular electric induction coil, an insulating pad on the said upper die member supporting said coil in spaced relation to said die members, a plurality of generally U-shaped flux guides positioned angularly about said die in straddling relation to said coil and pad with outer legs thereof in intimate contact with said upper die member adjacent said nozzle and with inner legs in intimate contact with said exposed upper surface of said lower die member, a second annular electric induction heating coil positioned adjacent said lower surface of said lower die member, and a plurality of angularly spaced apart, generally U-shaped flux guides received over said second coil with legs thereon in contact with said lower surface providing substantially uniform distribution of heating flux into said die members.

6. A circular film die comprising a generally circular die body defining generally radial passageways terminating in an outer peripheral film extruding nozzle, means for sustaining the temperature in said members at a desired extruding temperature comprising an annular electric induction coil, an annular insulating pad supporting said coil in spaced relation to said body, a plurality of angularly disposed radially extending flux guides positioned over said coil and having inwardly turned legs, the spaced apart distance of said guide legs being substantially greater than the width of said coils, and said guides being arranged in radially staggered relation to each other over said coil forming inner and outer series of guides sharing the same coil with the legs thereof secured in intimate contact with said die body for the controlled distribution of the flux of said coil within said body.

7. A circular film die comprising a generally circular die body defining generally radial passageways terminating in an outer peripheral film extruding nozzle, means for sustaining the temperature in said members at a desired extruding temperature comprising an annular electric induction coil, an annular insulating pad supporting said coil in spaced relation to said body and having a greater radial extent than said coil, a plurality of angularly disposed radially extending flux guides positioned over said coil and having inwardly turned legs, the spaced apart distance of said guide legs being substantially greater than the width of said coil, and said guides being arranged in radially staggered relation to each other over said coil forming inner and outer series of guides sharing the same coil with the legs thereof extended through openings formed in said insulating pad and secured in intimate contact with said die body for the controlled distribution of the flux of said coil within said body.

References Cited in the file of this patent

UNITED STATES PATENTS

| | | |
|---|---|---|
| 2,226,448 | Smith | Dec. 24, 1940 |
| 2,893,055 | Wenzel | July 7, 1959 |
| 2,937,402 | Pierce | May 24, 1960 |

FOREIGN PATENTS

| | | |
|---|---|---|
| 573,312 | Great Britain | Nov. 15, 1945 |
| 1,197,597 | France | Dec. 1, 1959 |